Oct. 25, 1966     J. C. EALEY ET AL     3,280,637
METHOD OF BALANCING A VEHICLE WHEEL USING A
REMOVABLE RING FOR POSITIONING WEIGHTS
Filed Aug. 21, 1964

INVENTORS.
JAMES C. EALEY,
RICHARD OUSLEY,
BY

Berman, Davidson & Berman
ATTORNEYS.

United States Patent Office 3,280,637
Patented Oct. 25, 1966

3,280,637
METHOD OF BALANCING A VEHICLE WHEEL USING A REMOVABLE RING FOR POSITIONING WEIGHTS
James C. Ealey, 614 Greenup Ave., and Richard Ousley, 700 Rogers Ave., both of Raceland, Ky.
Filed Aug. 21, 1964, Ser. No. 391,250
1 Claim. (Cl. 73—457)

This invention relates to a wheel balancing kit especially but not exclusively, for do-it-yourself use.

Among important objects of the invention is the provision of a kit of the kind indicated which provides for accurately balancing vehicle wheels, using balancing weights, in a simple, rapid, and easy manner, without requiring the use of special tools or skills.

Another object of the invention is the provision of an inexpensive and simple kit of the character indicated above, which involves a ring, adapted to be applied concentric to a wheel, clamp means for holding the ring in place, and balancing weights of different masses, adapted to be initially placed on the ring, in a balancing finding operation, and adapted to be transferred and secured to the rim of a wheel, once the point for the application of a weight has been determined.

Referring in detail to the drawings, a vehicle wheel 10 is shown, which has a rim 12, formed with an outboardly extending terminal flange 14.

Figure 5:
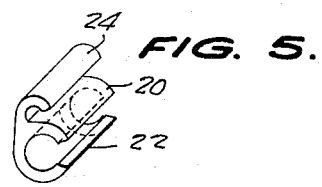
FIGURE 5 is a perspective view of one of the ring mounting clamps.

The illustrated kit comprises a closed ring 16, of a diameter slightly less than that of the flange 14, around which clamps 18 are equally circumferentially spaced. The clamps 18, as shown in FIGURES 3 and 5, comprise malleable metal bodies, formed with opposed and substantially similar outer and inner arcuate flanges 20 and 22, respectively, adapted to be spread away from each other, for receiving parts of the ring 16, and adapted to be compressed toward each other, for gripping the ring 16, to hold the clamps in place on the ring.

Figure 3:
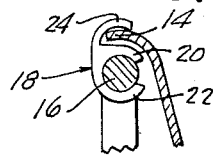
FIGURE 3 is an enlarged fragmentary transverse section taken on the line 3—3 of FIGURE 1.

The clamps 18 further comprise hook flanges 24 spaced outwardly from the outer arcuate flanges 20, of the clamps, the hook flanges 24 being adapted to be engaged over the wheel flange 14, as shown in FIGURE 3.

Figure 4:
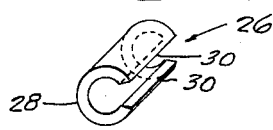
FIGURE 4 is a perspective view of a wheel balancing weight.

Balancing weights 26, to be provided in different sizes and weights, comprise, as shown in FIGURE 4, elongated split cylinders 28, having spaced and coextensive free edges 30. The weights 26 are made of suitable heavy and malleable metal, such as a lead composition.

Figure 1:
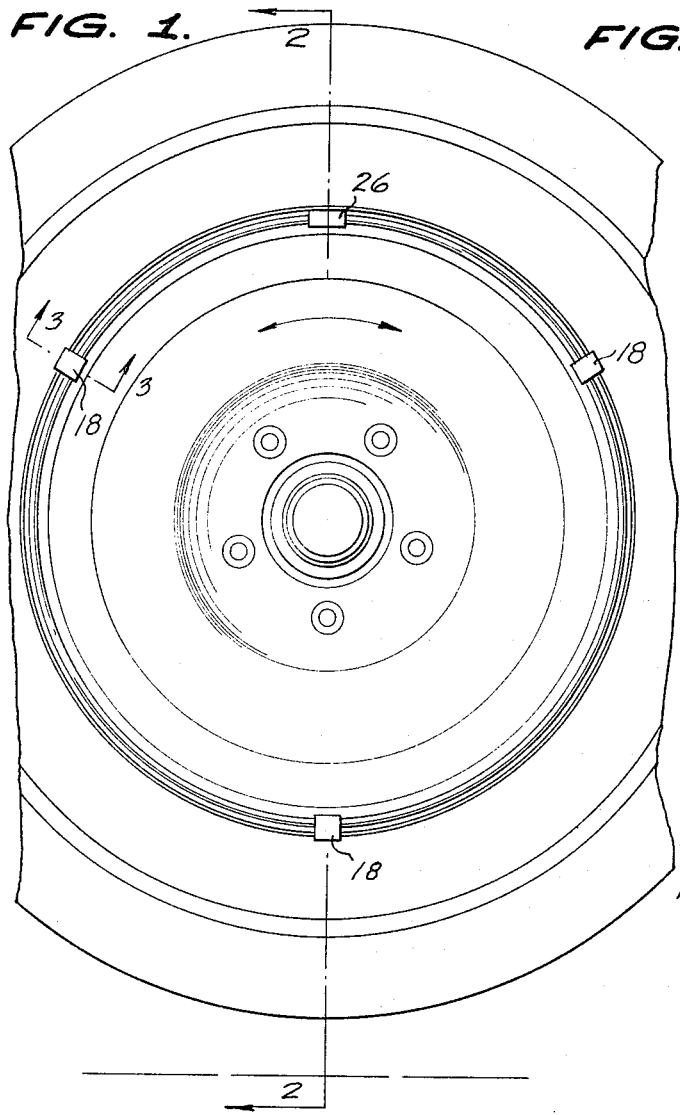
FIGURE 1 is a fragmentary outboard elevation of a vehicle wheel, showing a kit of the present invention installed thereon.
Figure 2:
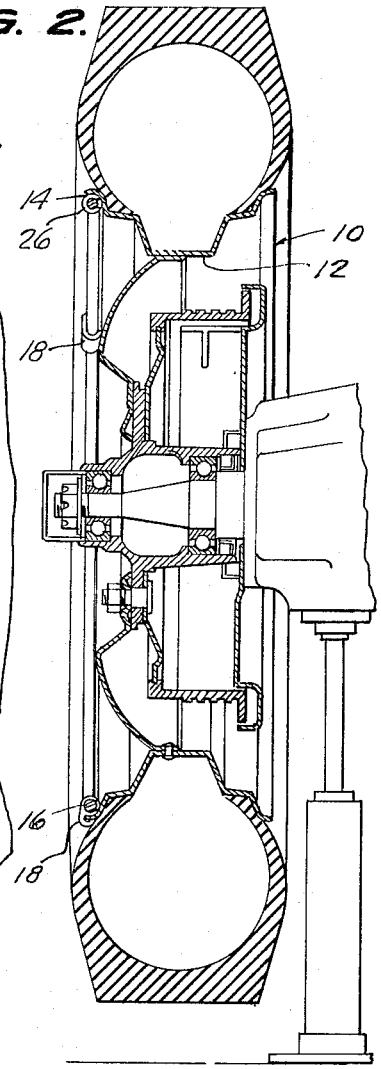
FIGURE 2 is a vertical transverse section taken on the line 2—2 of FIGURE 1.

For a wheel balancing operation, the wheel 10 is jacked up off the ground. If the wheel is unbalanced, the wheel will rotate itself so that the heavy part thereof will be at the bottom of the wheel. The ring 16 is then installed on the wheel 10, with one of the clamps 18 positioned at the bottom of the wheel, and the other clamps 18 at equally circumferentially spaced intervals, from the bottom clamp, as shown in FIGURE 1. This leaves substantial space, between the upper clamp 18, for the application and removal of balancing weights 26, to the ring 16, midway between the upper clamp 18.

A weight 26 is then selected and is lightly clamped on the ring 16, at the top thereof, so that it can be readily removed. Then rotate the wheel 10 about one-quarter turn, either left or right. If the wheel stays in place, the correct weight has been selected.

However, if the wheel 10 drifts back, so that the applied weight 26 is at the top of the wheel, this indicates that not enough weight has been applied. Upon applying a heavier weight, the wheel drifts this weight downwardly. This indicates too much weight has been applied. A weight 26 is then selected, which has a weight in between the weights tried and is tried out on the ring 16. This final weight is then removed from the ring 16 and applied and clamped to the wheel rim flange 14 at the location indicated by its position on the ring 16, the wheel rim flange 14 being received between the edges 30 of the weight 26 which are thereafter compressed thereagainst, and the ring 16 and the clamps 18 are then removed from the wheel.

What is claimed is:

The method of balancing a jacked-up vehicle wheel having a rim flange, which comprises installing a ring concentrically on the outboard side of the wheel rim flange, said ring having substantially the same diameter as said wheel rim flange, permitting the wheel to rotate itself to put the heavy part of the wheel at its bottom, then applying weight means to the ring, at the top of the wheel, sufficient to hold the wheel against rotation when manually rotated to either side of the top of the wheel, and then removing the weight means from the ring, applying the same to the indicated place on the wheel, and thereafter removing said ring from said wheel rim flange.

References Cited by the Examiner
UNITED STATES PATENTS

| | | | |
|---|---|---|---|
| 2,052,295 | 8/1936 | Hume | 73—480 |
| 2,336,920 | 12/1943 | Beaman | 301—5 |
| 3,202,459 | 8/1965 | Pierce | 301—5 |

FOREIGN PATENTS

| | | |
|---|---|---|
| 755,447 | 8/1933 | France. |
| 1,114,880 | 12/1955 | France. |
| 1,143,585 | 4/1957 | France. |

BENJAMIN HERSH, *Primary Examiner.*
R. J. JOHNSON, *Assistant Examiner.*